United States Patent
Keough

(10) Patent No.: US 7,995,639 B2
(45) Date of Patent: Aug. 9, 2011

(54) PULSE WIDTH MODULATED POWER INVERTER OUTPUT CONTROL

(75) Inventor: Graham A. Keough, Hainesport, NJ (US)

(73) Assignee: Consarc Corporation, Rancocas, NJ (US)

( * ) Notice: Subject to any disclaimer, the term of this patent is extended or adjusted under 35 U.S.C. 154(b) by 980 days.

(21) Appl. No.: 11/510,395

(22) Filed: Aug. 25, 2006

(65) Prior Publication Data

US 2007/0047612 A1    Mar. 1, 2007

Related U.S. Application Data

(60) Provisional application No. 60/711,348, filed on Aug. 25, 2005.

(51) Int. Cl.
*H05B 3/60* (2006.01)

(52) U.S. Cl. ............................ 373/52; 373/47; 373/49

(58) Field of Classification Search ............... 373/47, 373/49, 52, 70, 147, 104
See application file for complete search history.

(56) References Cited

U.S. PATENT DOCUMENTS

| | | | |
|---|---|---|---|
| 4,280,550 A | 7/1981 | Roberts | |
| 5,619,406 A * | 4/1997 | Divan et al. | 363/98 |
| 5,838,127 A * | 11/1998 | Young et al. | 318/293 |
| 5,859,519 A * | 1/1999 | Archer | 318/801 |
| 6,087,863 A | 7/2000 | Aflatouni | |
| 6,259,615 B1 | 7/2001 | Lin | |
| 6,687,284 B1 * | 2/2004 | Beauregard et al. | 373/102 |
| 6,696,770 B2 * | 2/2004 | Nadot et al. | 373/147 |
| 6,748,618 B1 * | 6/2004 | Darby et al. | 318/362 |
| 6,775,162 B2 | 8/2004 | Mihai et al. | |
| 6,801,063 B1 * | 10/2004 | Guo | 327/108 |
| 6,842,355 B2 * | 1/2005 | Kleveland | 363/132 |
| 6,891,739 B2 | 5/2005 | Nadd et al. | |
| 7,397,196 B2 * | 7/2008 | Leyten et al. | 315/224 |
| 2003/0117095 A1 * | 6/2003 | Gorti | 318/275 |
| 2003/0132211 A1 * | 7/2003 | Aigner | 219/130.21 |
| 2008/0035633 A1 * | 2/2008 | Weiss et al. | 219/666 |

* cited by examiner

*Primary Examiner* — Quang T Van
*Assistant Examiner* — Hung Nguyen
(74) *Attorney, Agent, or Firm* — Philip O. Post

(57) ABSTRACT

A method is provided for output control of a pulse width modulated power inverter used with a substantially resistive, single phase, ac load such as an electro-slag remelting furnace. In one application of the method, during each of the inverter's half cycle outputs, active switching devices are alternatively pulsed on and off during the half cycle so that only half of the switching transients in the half cycle are handled by one of the active switching devices.

30 Claims, 4 Drawing Sheets

US 7,995,639 B2

PULSE WIDTH MODULATED POWER INVERTER OUTPUT CONTROL

CROSS REFERENCE TO RELATED APPLICATIONS

This application claims the benefit of U.S. Provisional Application No. 60/711,348 filed Aug. 25, 2005, hereby incorporated herein by reference in its entirety.

FIELD OF THE INVENTION

The present invention relates to the control of the output of a pulse width modulated (PWM) power inverter, and in particular, to a power inverter used with an electro-slag remelting furnace.

BACKGROUND OF THE INVENTION

Electro-slag remelting furnaces require a single phase, ac supply with precise regulation of load current or power. See U.S. Pat. No. 4,280,550 for a description of an electro-slag remelting furnace. In the typical arrangement of an electro-slag remelting furnace, an electrode is vertically arranged above, but in contact with, a quantity of liquid slag inside a water cooled copper crucible. Power is connected to the top end of the electrode and the bottom of the crucible such that the current flows through the electrode and slag to the crucible. In this arrangement the slag acts essentially as a resistance heating element. The heat generated by the current flowing through the slag tends to melt off the tip of the electrode in contact with the slag and the droplets of liquid metal, being heavier than the slag, pass through the slag to form a metal pool under the slag which later solidifies into an ingot. In this manner the electrode is progressively melted (remelted) to be reformed as the ingot under the slag. Contact between the liquid metal and the liquid slag tends to refine the metal by removing inclusions such that the metallurgical quality of the ingot formed is superior to that of the electrode remelted, however, precise regulation of furnace current or power is essential to control of the metallurgical quality of the ingot formed in the electro-slag remelting furnace.

Traditional methods of controlling the power to an electro-slag remelting furnace includes transformer tap changing, but, this method requires frequent maintenance and does not typically achieve the required precision. The more common method of regulating the current is by phase angle control, but, this method tends to generate high levels of harmonics to the supply. The combination of a single phase load with high harmonics in the approximate range of 800 kilo-watts through 6,000 kilo-watts tends to be problematic for modern three phase electrical supply grids. Consequently there is a need for a better method of supplying and regulating the single phase current to an electro-slag remelting furnace.

One method of supplying and regulating the single phase current or power to an electro-slag remelting furnace is via a PWM inverter. FIG. 1 shows the output stage of a conventional PWM inverter having a full output bridge (also known as an "H-bridge"). Energy is stored as a dc voltage on the capacitor C. The switching devices (in this non-limiting example shown as IGBT devices) are typically switched on in pairs such that switching devices 1 and 4 are switched on for currents of positive polarity as illustrated by the arrows representing direction of current flow in FIG. 2(a), and switching devices 2 and 3 are switched on for currents of negative polarity as represented in FIG. 2(b). In each case the switching is controlled so as to achieve an output waveform of the desired frequency and shape, typically a sine wave. The switching control may typically be set to output a fixed number of pulses of given duration in each positive and negative half cycle, respectively, to control the output frequency. The width of the on portion of each pulse is then used to dynamically control both the output waveform and amplitude, respectively.

The electric load of an electro-slag remelting furnace is largely resistive (resistance R in the figures), but will also include an inductive component (inductance L in the figures). One of the effects of the inductance is that when the respective switching devices are turned off, the inductance tends to try to maintain the current flow. If appropriate measures were not taken this would generate dangerously high voltages, which could destroy the switching devices. To avoid this, a diode D1, D2, D3 and D4, is connected anti-parallel across each of the switching devices 1, 2, 3 and 4, respectively, as shown in the figures. In the normal way, the diode polarity is arranged such that the voltage on the capacitor C does not cause current to flow through the diodes. But when the active switches are turned off (not conducting), the reverse voltage generated by the inductance causes two of the diodes to become forward biased, and thus conduct the energy stored in the inductive element (inductor) back to the main storage capacitor C. See FIG. 3, for example, when switching devices 1 and 4 are just turned off. This effectively limits the voltage generated and thus avoids the destruction of the switching devices.

The problem is that when switching between a positive and a negative voltage or current, it is advantageous to discharge the energy stored in the inductance of the load back into the main storage capacitor, but when pulsing one side (polarity) it may, in some designs, become a limiting factor applied to the selection of the diode and the maximum frequency of switching of the inverter (and hence the precision of control).

A method is known whereby when the polarity is changed, both active switching devices turn off and are made inactive, and then the other two switching devices are made active. But, while switching in the given active polarity, one of the active switching devices is left on and the other is switched on and off according to the PWM. An example is shown in FIG. 4 where the case is considered that in the particular polarity, the active switching devices are switching devices 1 and 4, and switching device 1 is left on while the PWM control signal is applied to switching device 4. In this case when switching device 4 is turned off and switching device 1 remains on, the diode (D3) associated with switching device 3 acts as a free wheeling diode and the conventional current flow is as shown in FIG. 4.

Because switching device 1 has a relatively low on (conducting) resistance and the forward voltage of a single diode is relatively low, in this mode the energy stored in the inductor L is discharged relatively slowly. This means that current fluctuation due to PWM is reduced.

The disadvantage of this method is that, of the two active switching devices, one handles all the switching transients. In designs where the switching transients are a very large part of the thermal load on the switching devices, such as in high power inverters, this can cause an uneven temperature distribution in the respective switching devices and possibly early failure.

There exists, therefore, a need for a method for controlling an inverter used, for example, in an application such as a power supply for an electro-slag remelting furnace whereby the above limitation is minimized and the switching transient loads are more evenly distributed.

BRIEF SUMMARY OF THE INVENTION

In one aspect, the present invention is a method of controlling the output of a pulse width modulated inverter used, for example, as a power supply for an electro-slag remelting furnace. The inverter is formed from an H-bridge circuit that has at least one switching element in anti-parallel with a diode in each leg of the H-bridge circuit. A substantially resistive, single phase load is connected between the legs of the H-bridge. A first pair of switching elements in the first and second legs of the H-bridge alternatively conduct for the positive half cycle of the output, and a second pair of switching elements in the third and fourth legs of the H-bridge alternatively conduct for the negative half cycle of the output to establish a flow of ac current through the load. One of the first pair of switching elements is pulsed off and on for at least one first pulse period of the positive half cycle while the other one of the first pair of switching elements is conducting, but, then the second switching element of the first pair is pulsed off and on for at least one second pulse period of the positive half cycle while the first switching element of the first pair is still conducting. This alternative switching off and on of one of the two switching elements of the first pair while the other is conducting is repeated for the defined number of pulses of the positive half cycle of the output. The first pair of switching elements are then turned off and the second pair of switching elements is turned on for the negative half cycle of the output. The second pair of switching elements is controlled in a similar manner by alternatively pulsing off and on one of the switching elements while the other is conducting until the defined number of pulses for the negative half cycle is completed. The total number of pulses in both positive and negative half cycles, each of a given duration, is used to control the output frequency. By dynamically controlling the ratio of on time to off time of each pulse the output waveform and amplitude is controlled, but because the switching elements switch off and on alternatively the number of switching transients in each switching element is reduced.

Other aspects of the invention are set forth in this specification and appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 4 illustrates current flow in the output stage of the inverter shown in FIG. 1 with switching device 1 conducting and switching device 4 just turned off, after switching devices 1 and 4 were on.

FIG. 5 illustrates current flow in the output stage of the inverter shown in FIG. 1 with switching device 4 conducting and switching device 1 just turned off, after switching devices 1 and 4 were on.

DETAILED DESCRIPTION OF THE INVENTION

Figure 1:
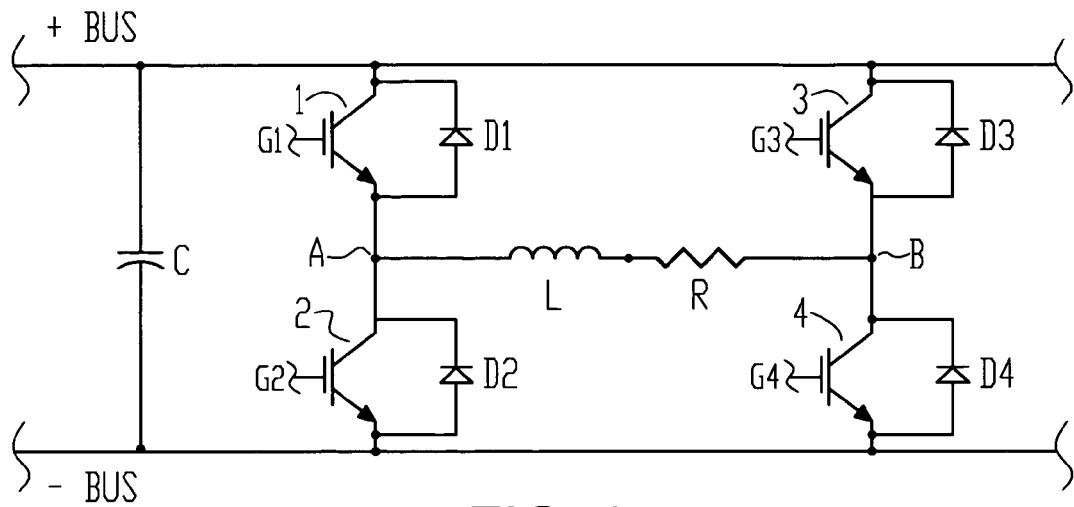
FIG. 1 is a schematic of the output stage of a typical power inverter.
Figure 2A:
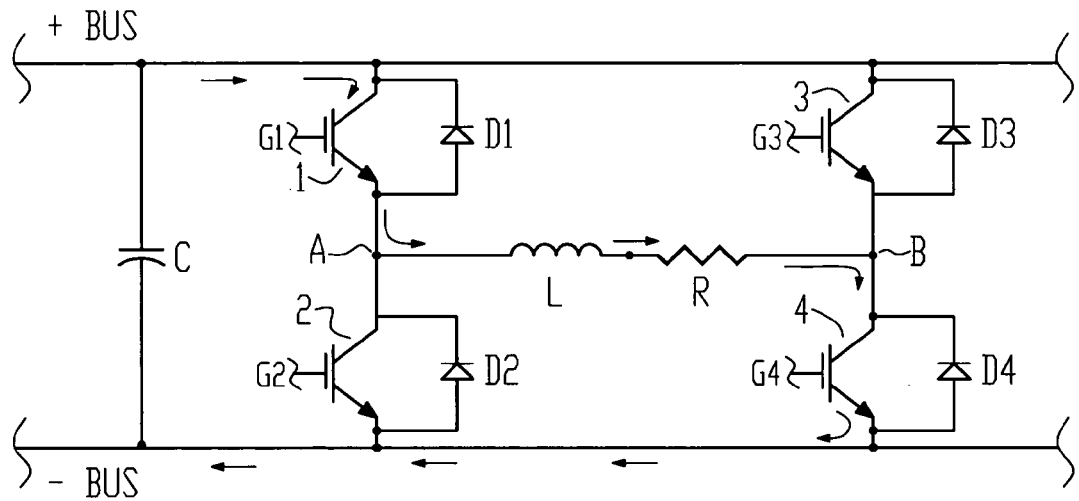
FIG. 2(*a*) and FIG. 2(*b*) illustrate direction of current flow in the output stage of the inverter shown in FIG. 1 with switching devices 1 and 4 on, and switching devices 3 and 2 on, respectively.
Figure 2B:
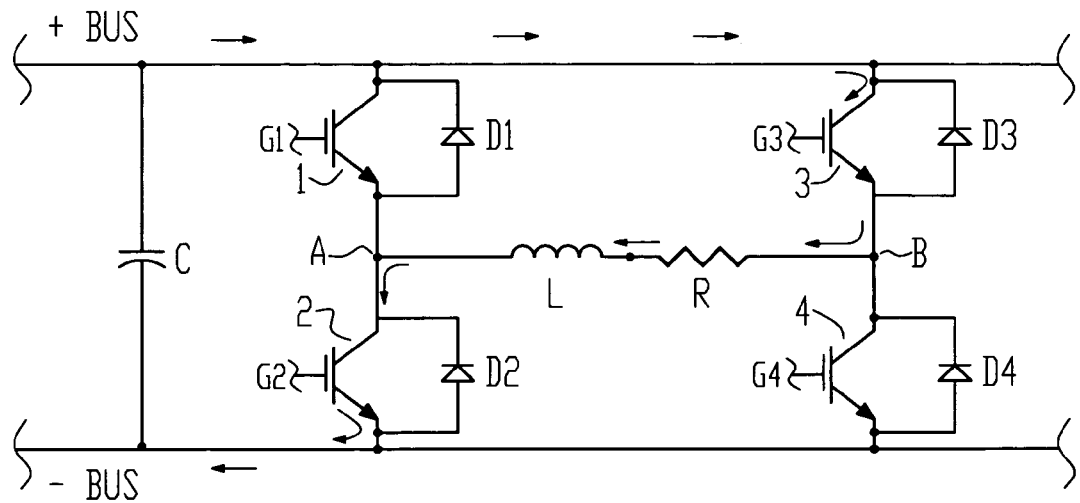
Figure 3:
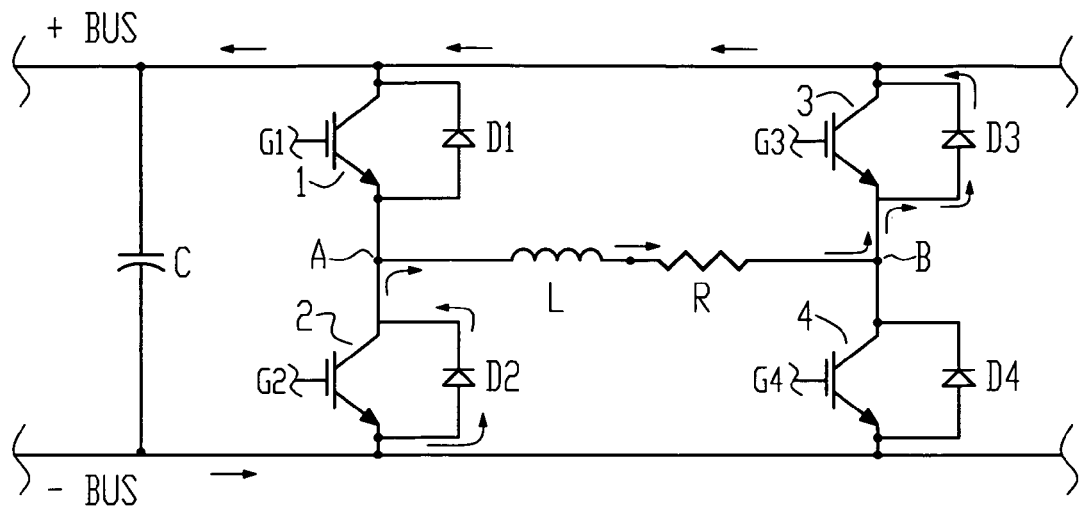
FIG. 3 illustrates current flow in the output stage of the inverter shown in FIG. 1 when switching devices 1 and 4 are just turned off.
Figure 4:
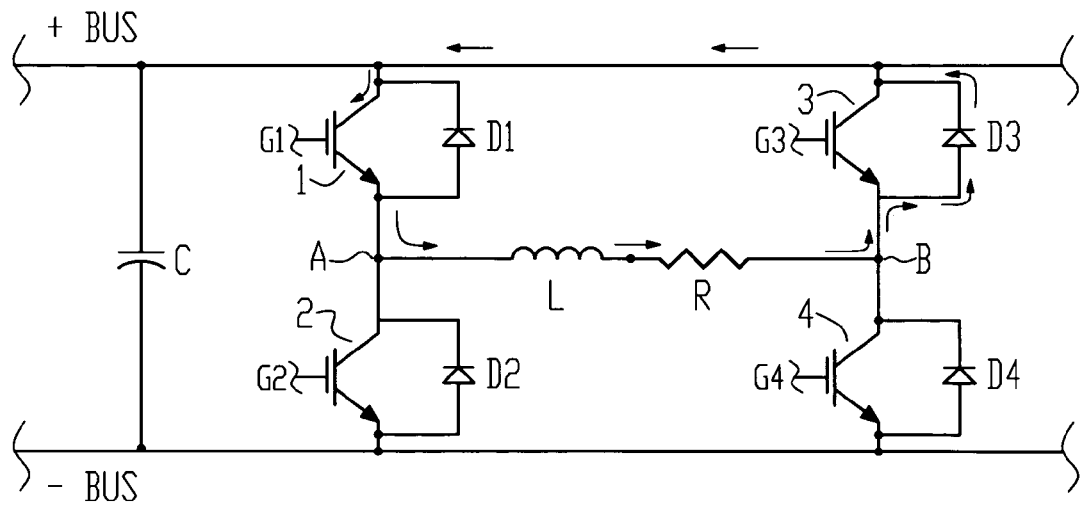
Figure 5:
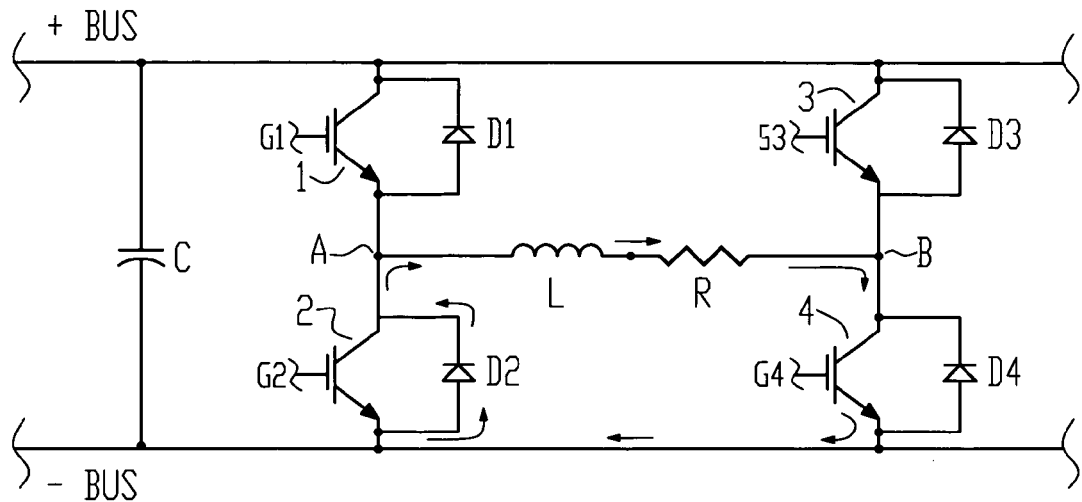
Figure 6:
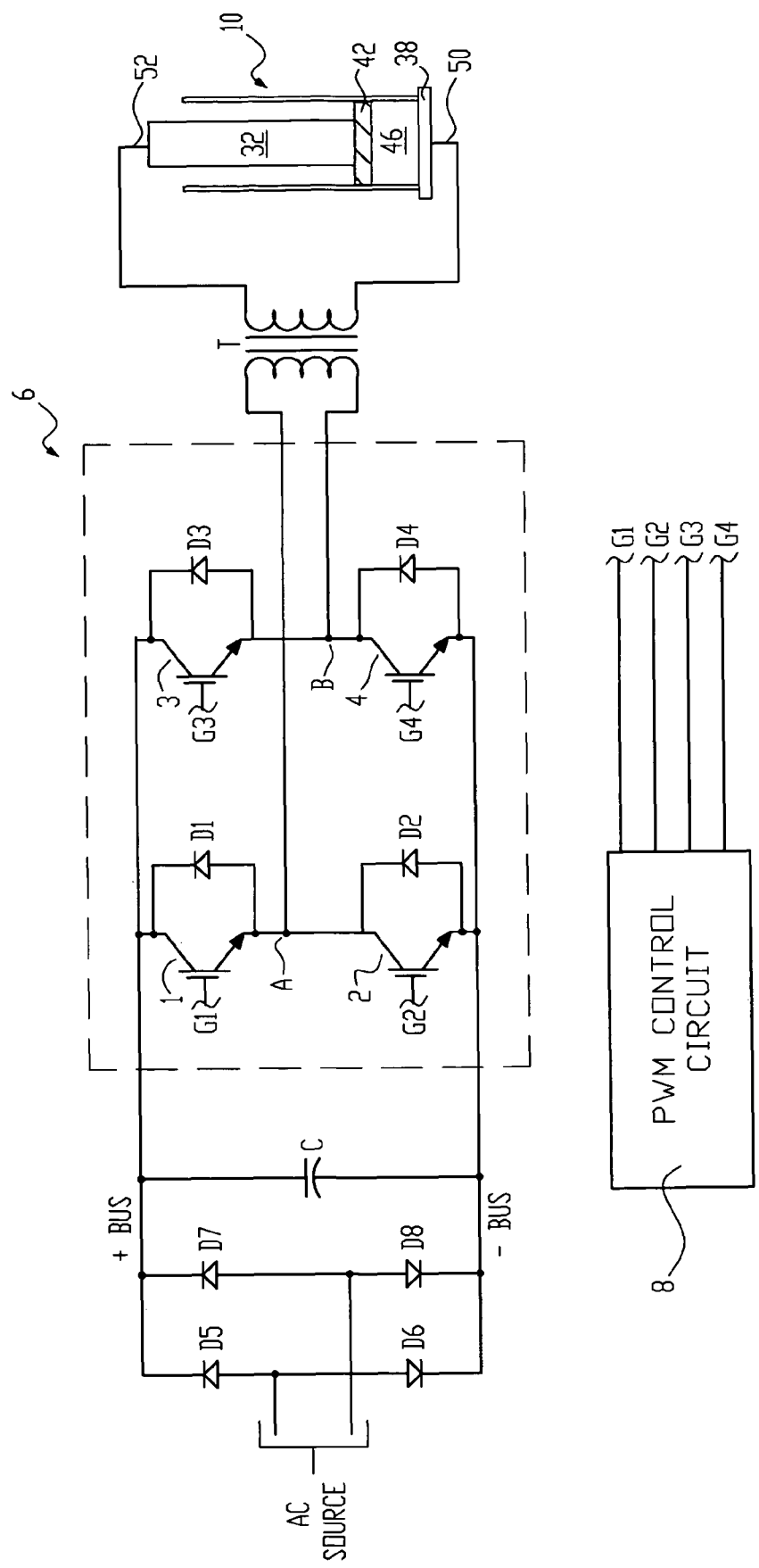
FIG. 6 illustrates the schematic for a typical single phase, full "H" bridge ac inverter used for the control scheme of the present invention.

FIG. 6 illustrates one application in which the PWM inverter output control method of the present invention can be used. DC power is inputted to inverter 6 from a single phase rectifier formed from diodes D5, D6, D7 and D8, with capacitor C serving as an energy storage and filter element. PWM control circuit 8 includes gate driver circuitry for gates G1, G2, G3 and G4 of switching devices 1, 2, 3 and 4, respectively. Although IGBT switching devices are illustrated in FIG. 6, other types of switching devices may be used. Each of the switching devices has an allowed switching rate, as defined by the specification for a specific switching device. The gate driver circuitry controls turn on and turn off of the switching devices, including alternative pulsing of the switching devices as further described below. In some examples of the invention, suitable circuitry provides inputs to the PWM control circuit 8 for regulating the alternative pulsing scheme, including pulse frequency and pulse duration. For example the magnitude of output current or power from the inverter, voltage across the output of the inverter, or voltage across the capacitor, may be inputted to the PWM control circuit. In some examples of the invention the disclosed pulsing scheme may be dynamically adjusted according to the instantaneous value of the inverter's output current or voltage. Further the dynamic adjustment may be accomplished according to the amplitude of the RMS value of the inverter's output current or voltage, which can be determined, for example, from the instantaneous value of the inverter's output current or voltage, respectively.

In FIG. 6, one type of load, namely an electro-slag remelting furnace, that can be used with the PWM inverter output control method of the present invention is illustrated. Optional transformer, T, provides ac power from the output of inverter 6 at circuit nodes "A" and "B". The transformer, if used, may be any type of kVA transformer element, or combination of elements. The load, electro-slag remelting furnace 10, is similar to the furnace disclosed in U.S. Pat. No. 4,280,550 (the 550 patent), which is hereby incorporated herein by reference in its entirety. Element numbers for the following features of the furnace are the same as those used in the 550 patent. Electrode 32 of the furnace is connected to conductor 52 as further described in the 550 patent, and conductor 52, in turn, is connected to one output connection of the inverter. Baseplate 38 is connected by conductor 50 to the other output connection of the inverter.

In other examples of the invention, a direct dc input to the inverter may be provided. Where the input is ac, the input may be supplied from a single phase source, as shown in FIG. 6, or a multi-phase ac source. The rectifier element may be of any suitable form when an ac input is used.

The output stage of inverter 6 comprises a number of switching devices that are respectively controlled to create an inverter ac output of a desired frequency, amplitude and waveform. Although one H-bridge arrangement is illustrated in FIG. 6, in other examples of the invention, multiple H-bridges, suitably arranged, may be used.

The load connected to the inverter is a static (non-rotating) largely resistive load, which, for example, is typical of the loading in an electro-slag remelting furnace. The inductive load component of the electro-slag remelting furnace tends to be reduced by the coaxial arrangement of furnace elements, but will vary with furnace size and electrode diameter, and so forth. Reference to inductance, or inductor L, relative to FIG. 6, refers to this inductive load component for this particular example of the invention. Inverter design and control must be able to handle this complex load and must also be able to operate during the startup phase of the process (cold start or hot start, respectively) and the hot topping or ramp down phase at the end of the process. Cold starting of the electro-slag remelting furnace, in particular, may involve periods of arcing and sudden fluctuation of the load from short circuit to open circuit, and visa versa, as the slag is initially melted. Even during the so called steady state portion of the remelt in an electro-slag remelting furnace, fluctuation of the contact area between the liquid tip of the electrode and the liquid slag causes a constantly fluctuating load impedance requiring dynamic control of load current. Because an electro-slag remelting furnace will typically require a supply rated in the range 800 kilo-watts to 6,000 kilo-watts, careful optimization of control power components is essential to reliable operation.

In the present invention, a bi-phase PWM output control of the inverter is utilized wherein the two active switching devices, or elements, are alternatively pulsed off while the other active switching device is held on, and visa versa.

In one non-limiting example of the invention, switching devices 1 and 4 are the active switching devices during the present half cycle of the output of the inverter, which is defined as the positive half cycle for the non-limiting circuit arrangement in FIG. 6. During the positive half cycle, while switching device 1 is on, switching device 4 is pulsed off for a period of "device 4 off time" and then turned on; then while switching device 4 is on, switching device 1 is pulsed off for a period "device 1 off time." This process of alternatively pulsing switching device 4 and switching device 1 off during the positive half cycle may be sequentially repeated throughout the positive half cycle.

In other examples of the invention, switching device 4 may be repeatedly pulsed off and on multiple times before switching device 1 is pulsed off and then on, at least once during the positive half cycle.

In some examples of the invention, the period of switching device 4 off time may be different from the period of switching device 1 off time and/or the number of switching device 4 off time pulses may be different from the number of switching device 1 off time pulses.

With the control method of the present invention, each time switching device 4 is pulsed off during the positive half cycle while switching device 1 is on, the switching transients are handled by switching device 4 while the circuit point of the load labeled "A" is effectively held close to the positive bus (+BUS) voltage by switching device 1, and the back electromagnetic force generated by the energy stored in the inductor L forward biases the anti-parallel diode D3 of switching device 3, which clamps load circuit point "B" near to the same positive bus voltage. Thus the energy stored in inductance L is discharged at a relatively low voltage which depends on the ratio of diode voltage to bus voltage. Conversely, in the alternate phase of the bi-phase PWM control of the present invention, each time switching device 1 is pulsed off during the positive half cycle while switching device 4 is on, the switching transients are handled by switching device 1 while the circuit point of the load labeled "B" is effectively held close to the negative bus (−BUS) voltage by switching device 4, and the back electromagnetic force generated by the energy stored in the inductor L forward biases the anti-parallel diode D2 of switching device 2, which clamps load circuit point "B" near to the same negative bus voltage. Thus the energy stored in inductance L is similarly discharged at a relatively low voltage.

The above description applies to the positive half cycle in this non-limiting example of the invention, when switching devices 1 and 4 are the active switching devices. In the same example, switching devices 3 and 2 are the active switching devices during the negative half cycle. During the negative half cycle, while switching device 3 is on, switching device 2 is pulsed off for a period of "device 2 off time" and then turned on; then while switching device 2 is on, switching device 3 is pulsed off for a period of "device 3 off time." This process of alternatively pulsing switching device 2 and switching device 3 off during the negative half cycle may be sequentially repeated throughout the negative half cycle.

In other examples of the invention, switching device 2 may be repeatedly pulsed off and on multiple times before switching device 3 is pulsed off and then on, at least once during the positive half cycle.

In some examples of the invention the period of switching device 2 off time may be different from the period of switching device 3 off time and/or the number of switching device 2 off time pulses may be different from the number of switching device 3 off time pulses.

During the negative half cycle, each time switching device 2 is pulsed off while switching device 3 is on, the switching transients are handled by switching device 2 while the circuit point of the load labeled "B" is effectively held close to the positive bus voltage by switching device 3, and the back electromagnetic force generated by the energy stored in the inductor L forward biases the anti-parallel diode D1 of switching device 1, which clamps load circuit point "A" near to the same positive bus voltage. Thus the energy stored in inductance L is discharged at a relatively low voltage which depends on the ratio of diode voltage to bus voltage. Conversely, in the alternate phase of the bi-phase PWM control of the present invention, each time switching device 3 is pulsed off during the negative half cycle while switching device 2 is on, the switching transients are handled by switching device 3 while the circuit point of the load labeled "A" is effectively held close to the negative bus voltage by switching device 2, and the back electromagnetic force generated by the energy stored in the inductor L forward biases the anti-parallel diode D4 of switching device 4, which clamps load circuit point "B" near to the same negative bus voltage. Thus the energy stored in inductance L is similarly discharged at a relatively low voltage.

The significant advantage is that with bi-phase PWM inverter output control of the present invention, effectively only half of the switching transients in a given half cycle are handled by one of the active switching devices. For high power inverters handling a load in the hundreds or thousands of kilo-watts, the switching transients are one of the design factors limiting a given design using specific devices. Thus for a given set of switching devices the benefits of the present invention include: the thermal heat load on each device may be reduce; or the effective reliability of the inverter may be improved; or the load rating may be increase; or the effective switching rate of the PWM signal may be increased; or a combination of any of the above.

In the above examples of the invention, the term "PWM" is used to describe the general type or class of inverter but is not intended to limit the present invention to the specific class of inverter wherein the time interval of successive pulses is controlled to generate a specific output waveform, for example a sine wave. The present invention includes, but not be limited to, those forms of PWM where the pulse width or switching point is determined by comparing the actual (or measured) output voltage or current to a reference voltage or current (digital or analog).

Figure 7:
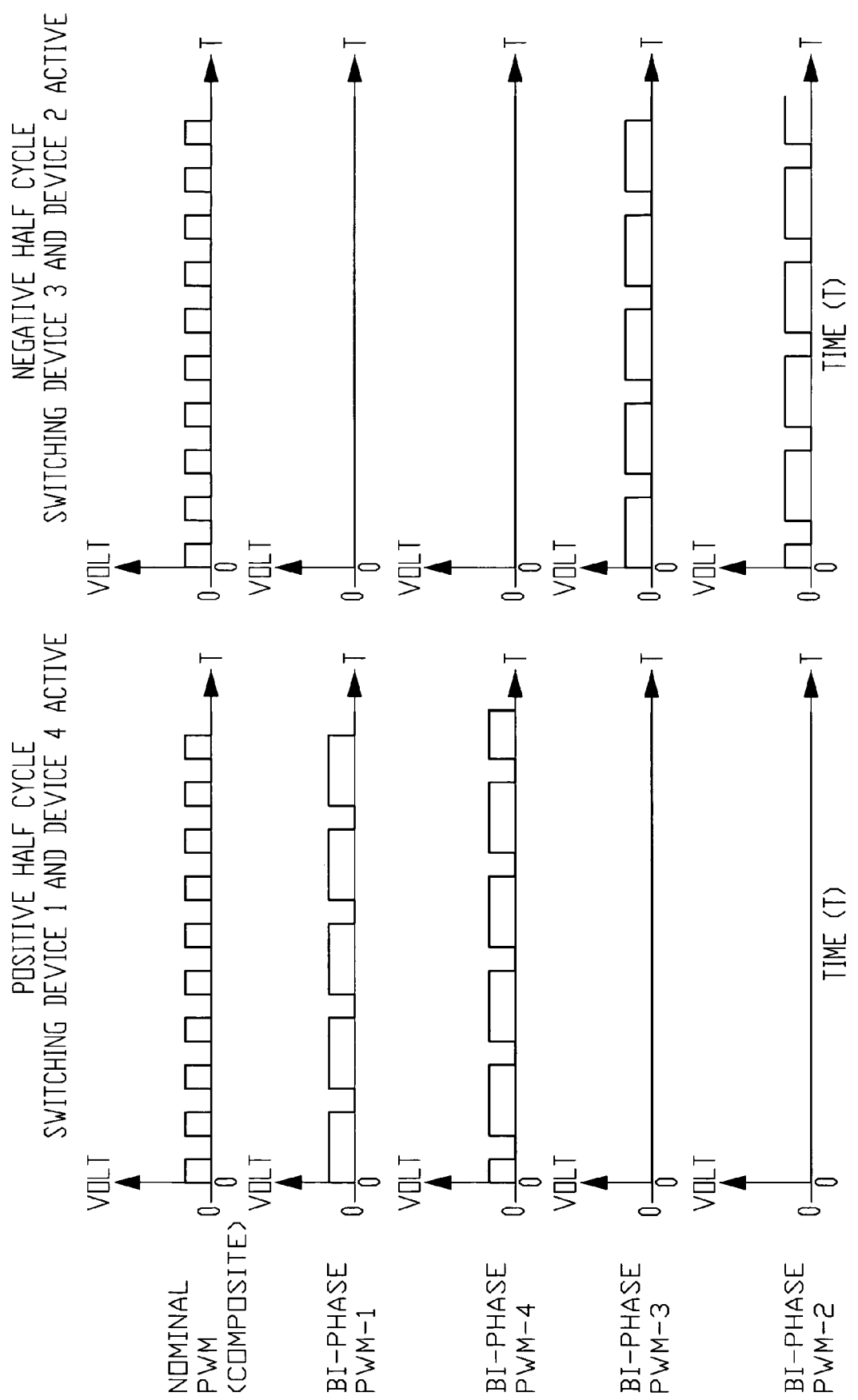
FIG. 7 illustrates in tabular form the bi-phase PWM control of one example of the present invention in terms of the logic levels applied to the gates of respective switching devices.

FIG. 7 illustrates in tabular form the bi-phase PWM inverter output control of one example of the present invention in terms of the logic levels applied to the respective switch device gates. A standard pulse width (labeled "NOMINAL PWM (COMPOSITE)") is shown for clarity and to indicate that the present invention is not specifically limited to a particular output wave form or method of deriving the PWM signal, but is rather concerned with the method of applying the signal to respective active devices in an alternating sequence which achieves the benefits indicated. The gate signals of the present invention for switching device 1 (column "BI-PHASE PWM-1"); switching device 2 (column "BI-PHASE PWM-2"); switching device 3 (column "BI-PHASE PWM-3"); and switching device 4 (column "BI-PHASE PWM-4") illustrated in FIG. 7 can be provided to the respective switching devices by circuitry known in the art.

The present invention will be most efficacious for large high power inverters in the range from approximately 800 kilo-watts to approximately 6,000 kilo-watts typically used with static (non-rotating) largely resistive single phase ac loads wherein the switching transients will be effectively reduced in each device, which will achieve higher reliability or higher effective PWM switching rates.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa. Further one skilled in the art may practice the invention by rearranging components to create the desired conditions or accomplish the desired results of the invention.

The foregoing examples do not limit the scope of the disclosed invention. The scope of the disclosed invention is further set forth in the appended claims.

The invention claimed is:

1. A method of controlling the output of a pulse width modulated inverter comprising at least one H-bridge circuit having a first and second switching elements in a first leg of the H-bridge circuit and a third and fourth switching elements in a second leg of the H-bridge circuit, an anti-parallel diode connected across each one of the first, second, third and fourth switching elements, the first and third switching elements connected to a positive bus of the pulse width modulated inverter and the second and fourth switching elements connected to a negative bus of the pulse width modulated inverter, a first load terminal at a common connection between the first and second switching elements and a second load terminal at a common connection between the third and fourth switching elements, each of the first, second, third and fourth switching elements having an allowed switching rate, the output of the inverter connected to a load connected between the first and second load terminals, the load comprising a substantially resistive, single phase load, the method comprising the steps of controlling current to the load by the first and fourth switching elements during the positive half cycle of the output waveform, and controlling current to the load by the second and third switching elements during the negative half cycle of the output waveform, to establish the flow of an ac current through the load, an improvement comprising, turning on the first and fourth switching elements during the positive half cycle while the second and third switching elements are turned off and alternatively pulsing the first switching element off and on for at least one first pulse period, at least once during the positive half cycle while the fourth switching element is turned on, and alternatively pulsing the fourth switching element off and on for at least one second pulse period, at least once during the positive half cycle while the first switching element is turned on, and turning on the second and third switching elements during the negative half cycle while the first and fourth switching elements are turned off and alternatively pulsing the third switching element off and on for at least one third pulse period, at least once during the negative half cycle while the second switching element is turned on, and alternatively pulsing the second switching element off and on for at least one fourth pulse period, at least once during the negative half cycle while the third switching element is turned on.

2. The method of claim 1 wherein the steps of alternatively pulsing the first and fourth switching elements, and alternatively pulsing the second and third switching elements are arranged to reduce the number of switching transients in the first and fourth switching elements or the second and third switching elements, respectively.

3. The method of claim 1 further comprising the step of adjusting the number of the first, second, third and fourth pulse periods responsive to the allowed switching rate.

4. The method of claim 3 further comprising the step of adjusting the duration of the first, second, third and fourth pulse periods to control the frequency waveform of the output of the inverter.

5. The method of claim 4 further comprising the step of dynamically adjusting the ratio of the on time to off time of each of the first, second, third and fourth pulse periods to control the current waveform of the output of the inverter to approximate that of a sine wave.

6. The method of claim 5 further comprising the step of adjusting the ratio of the on time to the off time of each of the first, second, third and fourth pulse periods to control the amplitude of the RMS value of current output of the inverter.

7. The method of claim 6 further comprising the step of operating the inverter with output power in the range from approximately 800 kilo-watts to approximately 6,000 kilo-watts.

8. The method of claim 4 further comprising the step of dynamically adjusting the ratio of the on time to off time of each of the first, second, third and fourth pulse periods to control the voltage waveform of the output of the inverter to approximate that of a sine wave.

9. The method of claim 8 further comprising the step of adjusting the ratio of the on time to the off time of each of the first, second, third and fourth pulse periods to control the amplitude of the RMS value of voltage output of the inverter.

10. The method of claim 9 further comprising the step of operating the inverter with output power approximately in the range from approximately 800 kilo-watts to approximately 6,000 kilo-watts.

11. A method of controlling current or power to an electro-slag remelting furnace from a pulse width modulated inverter comprising at least one H-bridge circuit having a first and second switching elements in a first leg of the H-bridge circuit and a third and fourth switching elements in a second leg of the H-bridge circuit, an anti-parallel diode connected across each one of the first, second, third and fourth switching elements, the first and third switching elements connected to a positive bus of the pulse width modulated inverter and the second and fourth switching elements connected to a negative bus of the pulse width modulated inverter, a first load terminal at a common connection between the first and second switching elements and a second load terminal at a common connection between the third and fourth switching elements, each of the first, second, third and fourth switching elements having an allowed switching rate, the output of the inverter connected to a load connected between the first and second load terminals, the load comprising a substantially resistive, single phase load, the method comprising the steps of controlling current to the load by the first and fourth switching elements during the positive half cycle of the output waveform, and controlling current to the load by the second and third switching elements during the negative half cycle of the output waveform, to establish the flow of an ac current through the load, an improvement comprising, turning on the first and fourth switching elements during the positive half cycle while the second and third switching elements are turned off and alternatively pulsing the first switching element off and on for at least one first pulse period, at least once during the positive half cycle while the fourth switching element is turned on, and alternatively pulsing the fourth switching element off and on for at least one second pulse period, at least once during the positive half cycle while the first switching element is turned on, and turning on the second and third switching elements during the negative half cycle while the first and fourth switching elements are turned off and alternatively pulsing the third switching element off and on for at least one third pulse period, at least once during the negative half cycle while the second switching element is turned on, and alternatively pulsing the second switching element off and on for at least one fourth pulse period, at least once during the negative half cycle while the third switching element is turned on.

12. The method of claim 11 wherein the steps of alternatively pulsing the first and fourth switching elements, and alternatively pulsing the second and third switching elements are arranged to reduce the number of switching transients in the first and fourth switching elements or the second and third switching elements, respectively.

13. The method of claim 11 further comprising the step of adjusting the number of the first, second, third and fourth pulse periods responsive to the allowed switching rate.

14. The method of claim 13 further comprising the step of adjusting the duration of the first, second, third and fourth pulse periods to control the frequency waveform of the output of the inverter.

15. The method of claim 14 further comprising the step of dynamically adjusting the ratio of the on time to off time of each of the first, second, third and fourth pulse periods to control the current waveform of the output of the inverter to approximate that of a sine wave.

16. The method of claim 15 further comprising the step of adjusting the ratio of the on time to the off time of each of the first, second, third and fourth pulse periods to control the amplitude of the RMS value of current output of the inverter.

17. The method of claim 16 further comprising the step of operating the inverter with output power in the range from approximately 800 kilo-watts to approximately 6,000 kilo-watts.

18. The method of claim 14 further comprising the step of dynamically adjusting the ratio of the on time to off time of each of the first, second, third and fourth pulse periods to control the voltage waveform of the output of the inverter to approximate that of a sine wave.

19. The method of claim 18 further comprising the step of adjusting the ratio of the on time to the off time of each of the first, second, third and fourth pulse periods to control the amplitude of the RMS value of voltage output of the inverter.

20. The method of claim 19 further comprising the step of operating the inverter with output power approximately in the range from approximately 800 kilo-watts to approximately 6,000 kilo-watts.

21. A method of controlling current or power to an electro-slag remelting furnace from a pulse width modulated inverter comprising at least one H-bridge circuit having a first and second switching elements in a first leg of the H-bridge circuit and a third and fourth switching elements in a second leg of the H-bridge circuit, an anti-parallel diode connected across each one of the first, second, third and fourth switching elements, the first and third switching elements connected to a positive bus of the pulse width modulated inverter and the second and fourth switching elements connected to a negative bus of the pulse width modulated inverter, a first load terminal at a common connection between the first and second switching elements and a second load terminal at a common connection between the third and fourth switching elements, each of the first, second, third and fourth switching elements having an allowed switching rate, the output of the inverter connected to a load connected between the first and second load terminals, the load comprising a substantially resistive, single phase load, the method comprising the steps of controlling current to the load by the first and fourth switching elements during the positive half cycle of the output waveform, and controlling current to the load by the second and third switching elements during the negative half cycle of the output waveform, to establish the flow of an ac current through the load, an improvement comprising, discharging load energy during the positive half cycle by alternatively pulsing the first switching element off and on for at least one first pulse period, at least once during the positive half cycle while the fourth switching element is turned on, and alternatively pulsing the fourth switching element off and on for at least one second pulse period, at least once during the positive half cycle while the first switching element turned on, and discharging load energy during the negative half cycle by alternatively pulsing the third switching element off and on for at least one third pulse period, at least once during the negative half cycle while the second switching element is turned on, and alternatively pulsing the second switching element off and on for at least one fourth pulse period, at least once during the negative half cycle while the third switching element is turned on.

22. The method of claim 21 wherein the steps of alternatively pulsing the first and fourth switching elements, and alternatively pulsing the second and third switching elements are arranged to reduce the number of switching transients in the first and fourth switching elements or the second and third switching elements, respectively.

23. The method of claim 21 further comprising the step of adjusting the number of the first, second, third and fourth pulse periods responsive to the allowed switching rate.

24. The method of claim 23 further comprising the step of adjusting the duration of the first, second, third and fourth pulse periods to control the frequency waveform of the output of the inverter.

25. The method of claim 24 further comprising the step of dynamically adjusting the ratio of the on time to off time of each of the first, second, third and fourth pulse periods to control the current waveform of the output of the inverter to approximate that of a sine wave.

26. The method of claim 25 further comprising the step of adjusting the ratio of the on time to the off time of each of the first, second, third and fourth pulse periods to control the amplitude of the RMS value of current output of the inverter.

27. The method of claim 26 further comprising the step of operating the inverter with output power in the range from approximately 800 kilo-watts to approximately 6,000 kilo-watts.

28. The method of claim 24 further comprising the step of dynamically adjusting the ratio of the on time to off time of each of the first, second, third and fourth pulse periods to control the voltage waveform of the output of the inverter to approximate that of a sine wave.

29. The method of claim 28 further comprising the step of adjusting the ratio of the on time to the off time of each of the first, second, third and fourth pulse periods to control the amplitude of the RMS value of voltage output of the inverter.

30. The method of claim 29 further comprising the step of operating the inverter with output power approximately in the range from approximately 800 kilo-watts to approximately 6,000 kilo-watts.

* * * * *